US012754918B2

(12) United States Patent
Ghafourifar et al.

(10) Patent No.: US 12,754,918 B2
(45) Date of Patent: Oct. 6, 2026

(54) SYSTEMS AND METHODS FOR AI BASED NORMALIZATION AND INDEXING OF MULTI-PROTOCOL MESSAGE CONTENT USING UNIVERSAL MESSAGE OBJECTS

(71) Applicant: Entefy Inc., Palo Alto, CA (US)

(72) Inventors: Mehdi Ghafourifar, Los Altos Hills, CA (US); Brienne Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 133 days.

(21) Appl. No.: 18/351,365

(22) Filed: Jul. 12, 2023

(65) Prior Publication Data

US 2024/0020305 A1 Jan. 18, 2024

Related U.S. Application Data

(63) Continuation of application No. 14/985,929, filed on Dec. 31, 2015, now abandoned.

(51) Int. Cl.

| | |
|---|---|
| ***G06F 16/20*** | (2019.01) |
| ***G06F 16/22*** | (2019.01) |
| ***G06F 16/245*** | (2019.01) |
| ***G06F 16/2455*** | (2019.01) |
| ***G06Q 10/107*** | (2023.01) |
| ***H04L 51/08*** | (2022.01) |
| ***H04L 51/212*** | (2022.01) |
| ***H04L 51/56*** | (2022.01) |

(52) U.S. Cl.

CPC .... *G06F 16/24564* (2019.01); *G06F 16/2228* (2019.01); *G06F 16/245* (2019.01); *G06Q 10/107* (2013.01); *H04L 51/08* (2013.01); *H04L 51/212* (2022.05); *H04L 51/56* (2022.05)

(58) Field of Classification Search

CPC ............ G06F 16/24564; G06F 16/245; G06F 16/2228; H04L 51/08; H04L 51/56; H04L 51/212; G06Q 10/107

USPC .......................................................... 707/694

See application file for complete search history.

(56) References Cited

U.S. PATENT DOCUMENTS 7,765,228 B2 7/2010 Eichstaedt et al.
9,325,842 B1 * 4/2016 Siddiqi ................ G06F 3/0482

(Continued)

FOREIGN PATENT DOCUMENTS

WO WO2005050488 A1 * 6/2005

*Primary Examiner* — Daniel A Kuddus

(74) *Attorney, Agent, or Firm* — Haynes and Boone, LLP

(57) ABSTRACT

In email and messaging systems, it's often difficult—and sometimes nearly impossible—to locate a particular URL link that was sent to you (or that you sent to someone else). This problem can become worse as time passes and it becomes more and more difficult to remember the time and/or context in which you sent or received the particular URL link. This disclosure relates to apparatuses, methods, and computer readable media to permit computing devices to utilize a single, integrated communications platform that may automatically index and archive message data (including "secondary message content," such as: file attachments; URL links to other files and/or webpages embedded in the original message; and text and/or other media information located on the webpages that are linked out to by the links embedded in the original message, etc.) from messages in a variety of communications formats and received over a variety of communications protocols.

20 Claims, 11 Drawing Sheets

(56) References Cited

U.S. PATENT DOCUMENTS

| | | | | |
|---|---|---|---|---|
| 2002/0083054 | A1 | 6/2002 | Peltonen et al. | |
| 2013/0024424 | A1 | 1/2013 | Prahlad et al. | |
| 2014/0052684 | A1 * | 2/2014 | Liao | G06F 40/30<br>706/46 |
| 2015/0222517 | A1 * | 8/2015 | McLaughlin | G06F 21/445<br>713/171 |
| 2016/0357770 | A1 | 12/2016 | Wu et al. | |
| 2016/0359790 | A1 * | 12/2016 | Zhang | G06Q 30/0252 |
| 2017/0193084 | A1 * | 7/2017 | Ghafourifar | G06F 16/334 |
| 2019/0229939 | A1 * | 7/2019 | Tuatini | H04L 12/1859 |
| 2022/0365968 | A1 * | 11/2022 | Wahl | H04L 51/214 |

* cited by examiner

```
{
"id": "545436576657",
"attachments": [
{
"id": "497605705665",
"fileName": "amazing.mp4",
"fileSize": 8457237357
}
],
"body": {
"text": "Hey guys, we are modifying company policy regarding email
messsages tomorrow,
so please be on the lookout for a followup",
"html": "<p> Hey guys, we are modifying company policy regarding
email messsages
tomorrow<table><row> , so please be on the lookout for </row><row>
a followup </row></table>
</p>"
},
"createdOn": "2012-10-09T20:30:40.678Z",
"currentMsgGrpId": "789437489320",
"date": "2012-10-09T20:30:40.678+00:00",
"headers": {
"x-mailer": "coolcompany.com"
},
"isAReply": false,
"isFlagged": false,
"isForwarded": false,
"isOutgoing": true,
"isRead": true,
"isRepliedTo": false,
"importanceLevel": 5,
"linksTo": "894324893248",
"participants": [
{
"from": [
{
"contact": {
"id": "63423324",

"name": "Bob Jones",
"photoUrl": "awesome-pics.com/2837635958764.jpg",
"isMostLikely": true
},
"serviceIdentifier": {
"id": "3249855782346",
"address": "6509284736",
"type": "sms"
}
}
],
```

FIG. 4B

```
"to": [
{
"contact": {
"id": "1139178368",
"name": "Sam Smith",
"photoUrl": "awesome-pics.com/2837632958764.jpg"
},
"serviceIdentifier": {
"id": "-23485763425",
"address": "5553625143",
"type": "sms"
}
}
],
"cc": [],
"bcc": []
},
{
"from": [
{
"contact": {
"id": "63423324",
"name": "Bob Jones",
"photoUrl": "awesome-pics.com/2837635958764.jpg",
"isMostLikely": true
},
"serviceIdentifier": {
"id": "7846320423",
"address": "contact@yourcompany.com",
"type": "email"
}
},
{
"contact": {
"id": "-7253526752",
"name": "Jack Barberry",
"photoUrl": "awesome-pics.com/2837635958764.jpg",
"isMostLikely": false
},
"serviceIdentifier": {
"id": "7846320423",
"address": "contact@yourcompany.com",
"type": "email"
}
}
],
"to": [
{
"contact": {
"id": "8432948324923",
```

FIG. 4C

```
"name": "James Johnson",
"photoUrl": "awesome-pics.com/2837632958764.jpg"
},
"serviceIdentifier": {
"id": "123214566",
"address": "james@email.com",
"type": "email"
}
}
],
"cc": [
{
"contact": {
"id": "84932472304",
"name": "Alice Kellerton",
"photoUrl": "awesome-pics.com/2937632958764.jpg"
},
"serviceIdentifier": {
"id": "73846234823",
"address": "alice@hotmail.com",
"type": "email"
}
}
],
"bcc": []
}
],
"numberOfAttachments": 1,
"originalMsgGrpId": "23591262334",
"readDate": "2012-10-09T20:30:40.678+00:00",
"refersTo": "89213720343",
"securefy": {},
"sendOn": "2015-10-19T20:10:40.678+00:00",
"sentSuccessfully": true,
"snippet": "Hey guys, we are modifying company policy
regarding email...",
"snoozedUntil": null,
"source": {
"type": "internal"
},
"subject": "Policy Updates",
"tags": "work, yourcompany",
"type": "multi",
"uid": 5723,
"updatedOn": "2012-10-09T20:30:40.678+00:00"
}
```

FIG. 4D

SYSTEMS AND METHODS FOR AI BASED NORMALIZATION AND INDEXING OF MULTI-PROTOCOL MESSAGE CONTENT USING UNIVERSAL MESSAGE OBJECTS

This application claims priority to, and is a continuation of, U.S. patent application Ser. No. 14/985,929, filed Dec. 31, 2015, entitled "Systems and Methods for Automatic Archiving, Sorting, and/or Indexing of Secondary Message Content," all of which is hereby incorporated by reference in its entirety.

TECHNICAL FIELD

This disclosure relates generally to apparatuses, methods, and computer readable media for automatically archiving, sorting, and/or indexing content related to messages sent to and from computing devices across multiple communications formats and protocols.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, XMPP, etc.) has led to a communications experience that many users find fragmented and restrictive. Users desire an experience where all of their data is accessible, searchable, and sortable to them through a single interface.

Typically, users receive data, for example, text, voice, video and images, through a variety of communications formats. Data received from such sources is generally accessible, searchable, and/or sortable through only the communications format used to transmit it. As such, users experience difficulties in organizing, managing, and searching across such data. For example, a user may have to open various communications applications to discover where a certain data file is located. Even then, that file must be sent by, for example, email or direct message to another communications application in order to enable sharing with other users. This process is time-consuming and may cause difficulties in locating user data.

Moreover, some message or communications may contain what is referred to herein as "secondary message content," e.g., message content that may include: file attachments; links to other files and/or webpages; as well as text and/or other media information on the files and/or webpages that are linked out to by the links embedded in the original message, etc. As such, easily searching for particular content across all of a given user's communications formats and communications applications—including any "secondary message content" that may be embedded in the user's messages—is not possible. In fact, no methods are known for the creation of a single, integrated communications platform that can automatically index and archive data (including "secondary message content") from messages in a variety of communications formats and received over a variety of communications protocols, index the data for deep searching, and allow for such data to be accessible to users through a single communications application interface.

The subject matter of the present disclosure is directed to overcoming, or at least reducing the effects of, one or more of the problems set forth above. To address these and other issues, techniques that enable automatic archival, indexing, and accessibility of data, including "secondary message content" originating from messages received in a plurality of communications formats and delivered via a plurality of communications protocols.

BRIEF DESCRIPTION OF THE DRAWINGS

FIGS. 4B-4D contain a code representation of an exemplary Unified Message Object (UMO).

DETAILED DESCRIPTION

Disclosed are apparatuses, methods, and computer readable media for automatically archiving, sorting, and/or indexing content related to messages sent to and from computing devices across multiple communications formats and protocols. More particularly, but not by way of limitation, this disclosure relates to apparatuses, methods, and computer readable media to permit computing devices, e.g., smartphones, smart devices, tablets, wearable devices, laptops, and the like, to utilize a single, integrated communications platform that can automatically index and archive message data (including "secondary message content," such as: file attachments; links to other files and/or webpages; as well as text and/or other media information on the files and/or webpages that are linked out to by the links embedded in the original message, etc.) from messages in a variety of communications formats and received over a variety of communications protocols. The indexed message data may thus allow users to conduct deep searches for message content (and/or secondary message content, such as URL links) in a seamless fashion that is accessible to users through a single communications application interface.

Figure 1A:
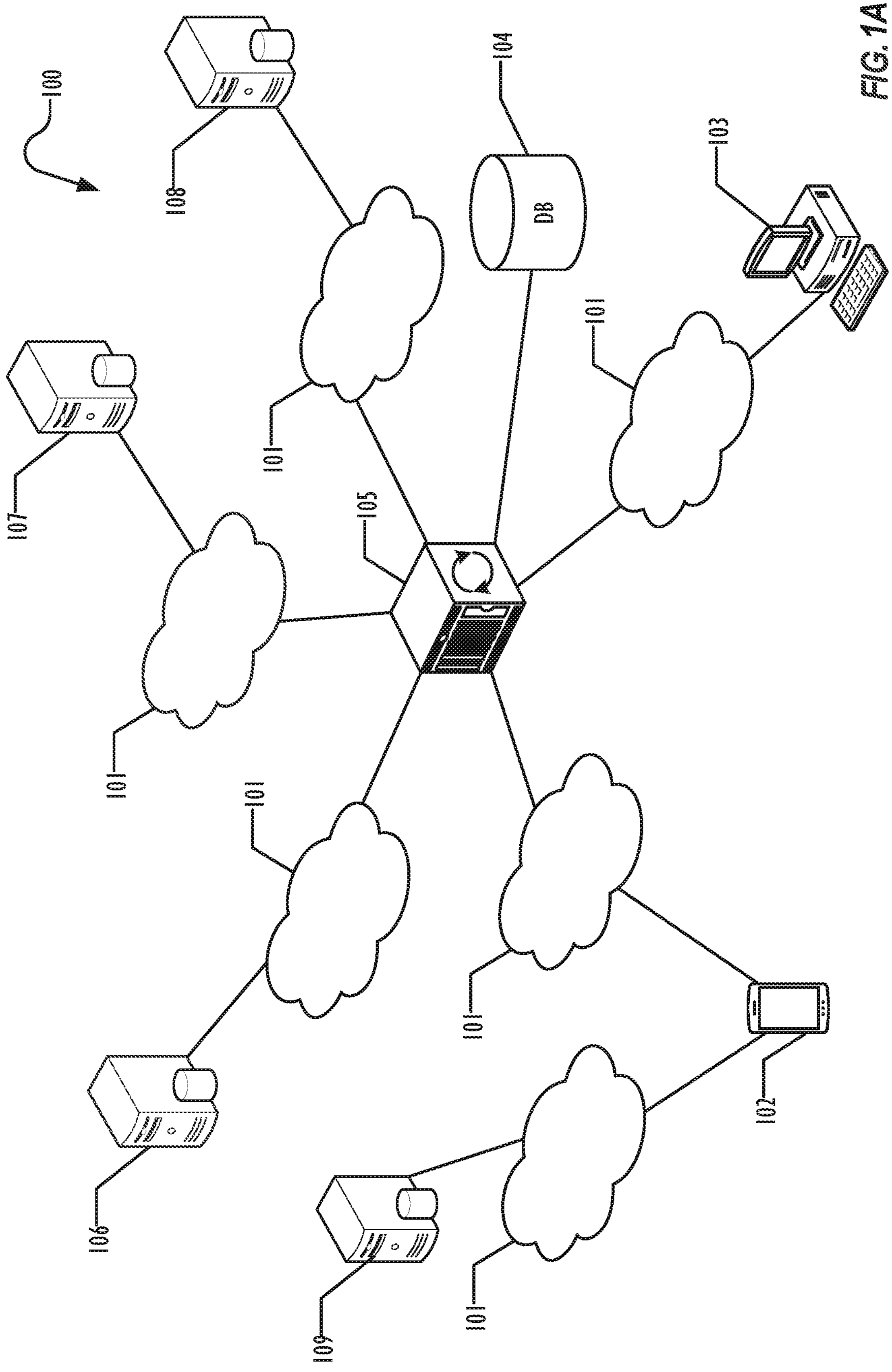
FIG. 1A is a block diagram illustrating a server-entry point network architecture infrastructure, according to one or more disclosed embodiments.

Referring now to FIG. 1A, a server-entry point network architecture infrastructure 100 is shown schematically. Infrastructure 100 contains computer networks 101. Computer networks 101 include many different types of computer networks available today, such as the Internet, a corporate network, or a Local Area Network (LAN). Each of these networks can contain wired or wireless devices and operate using any number of network protocols (e.g., TCP/IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 101 for use with mobile communication devices. As is known in the art, mobile cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the multi-protocol, multi-format communication composition and inbox feed system to be described herein. In the server-entry point network architecture infrastructure 100 of FIG. 1A, centralized sync server 105 may be responsible for querying and obtaining all the messages from the various communication sources for individual users of the system and keeping the multi-protocol, multi-format inbox feed for a particular user of the system synchronized with the data on the various third party communication servers that the system is in communication with. Database(s) 104 may be used to store local copies of messages sent and received by users of the system, as well as individual documents associated with a particular user, which may or may not also be associated with particular communications of the users. As such, the database portion allotted to a particular user will contain a record of all communications in any form to and from the user.

Server 106 in the server-entry point network architecture infrastructure 100 of FIG. 1A represents a third party email server (e.g., a GOOGLE® or YAHOO!® email server). (GOOGLE is a registered service mark of Google Inc. YAHOO! is a registered service mark of Yahoo! Inc.) Third party email server 106 may be periodically pinged by sync server 105 to determine whether particular users of the multi-protocol, multi-format communication composition and inbox feed system have received any new email messages via the particular third-party email services. Server 107 represents a represents a third party instant message server (e.g., a YAHOO!® Messenger or AOL® Instant Messaging server). (AOL is a registered service mark of AOL Inc.) Third party instant messaging server 107 may also be periodically pinged by sync server 105 to determine whether particular users of the multi-protocol, multi-format communication composition and inbox feed system described herein have received any new instant messages via the particular third-party instant messaging services. Similarly, server 108 represents a third party social network server (e.g., a FACEBOOK® or TWITTER® server). (FACEBOOK is a registered trademark of Facebook, Inc. TWITTER is a registered service mark of Twitter, Inc.) Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' users are communicating with one another via the multi-protocol, multi-format communication system itself, such communications may occur entirely via sync server 105, and third party servers 106-109 may not need to be contacted.

Figure 1B:
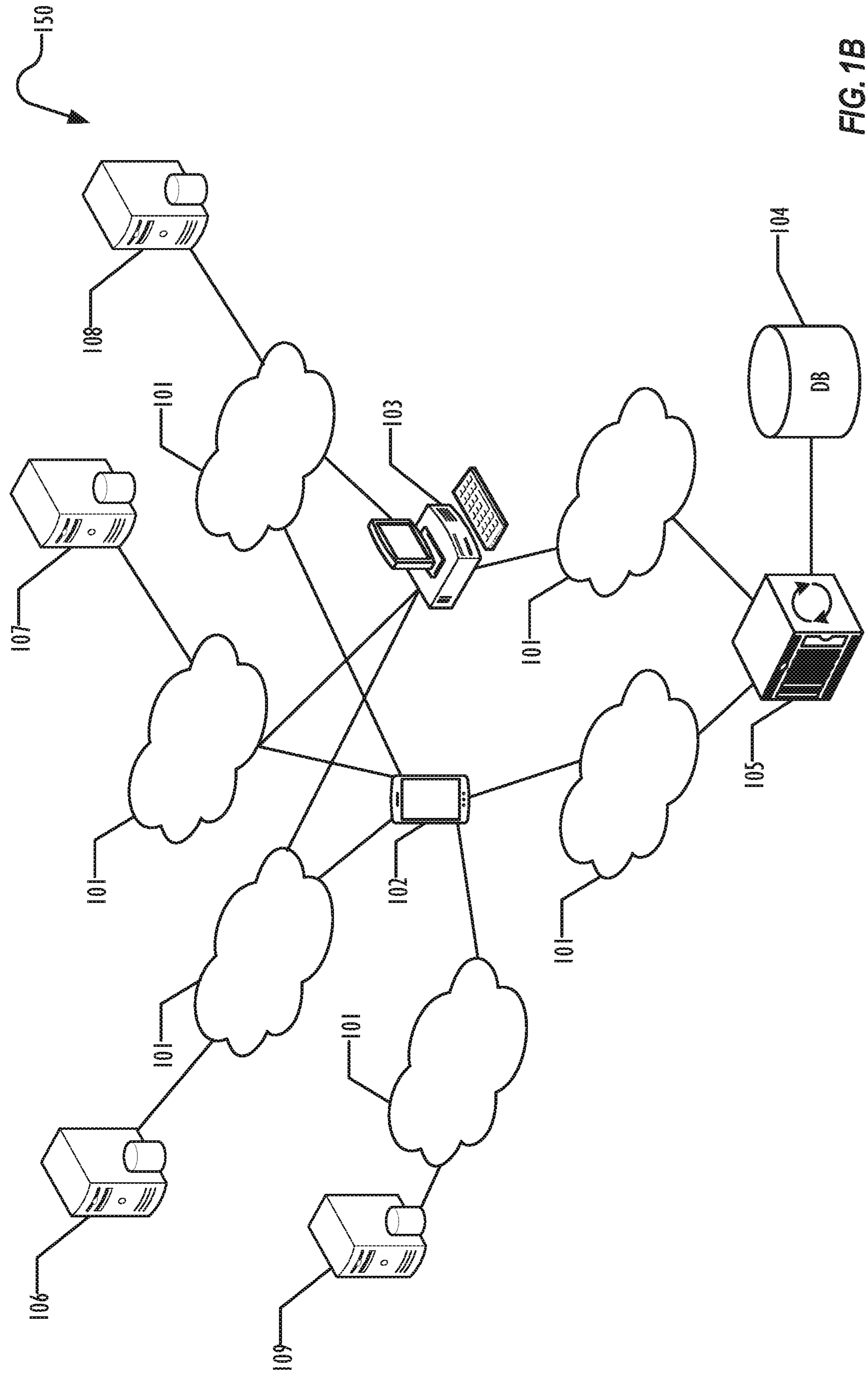
FIG. 1B is a block diagram illustrating a client-entry point network architecture infrastructure, according to one or more disclosed embodiments.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third party servers.

Figure 2A:
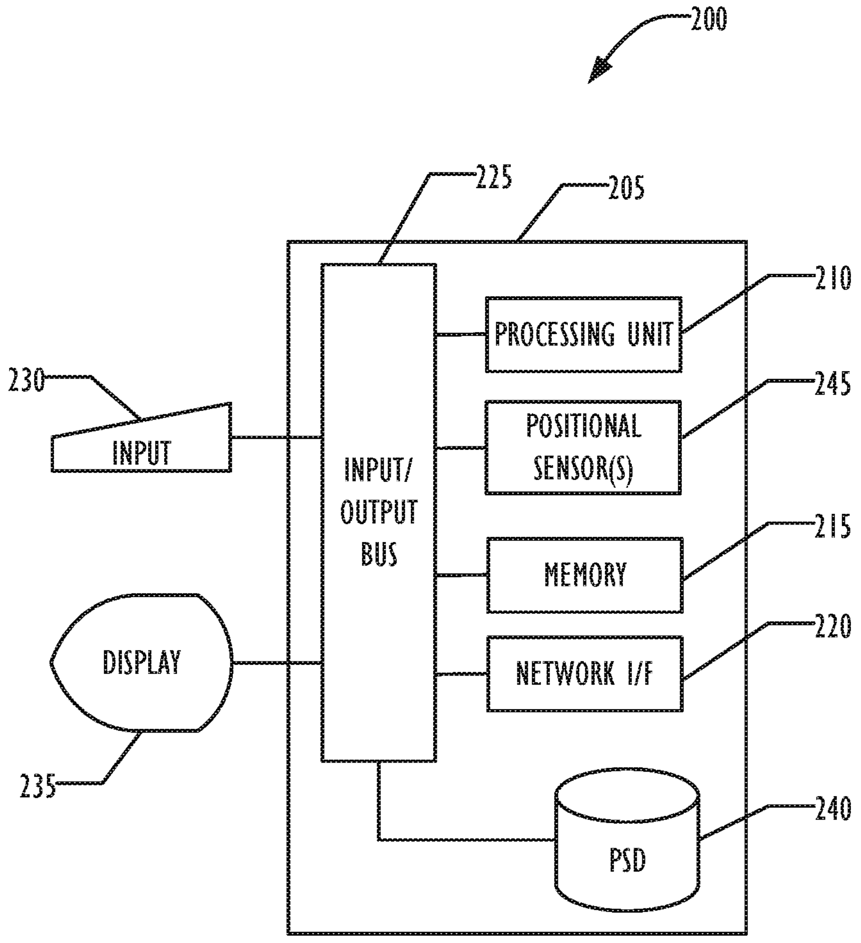
FIG. 2A is a block diagram illustrating a computer which could be used to execute the multi-format/multi-protocol communication techniques described herein according to one or more of disclosed embodiments.

Referring now to FIG. 2A, an example processing device 200 for use in the systems and methods outlined exemplarily herein. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
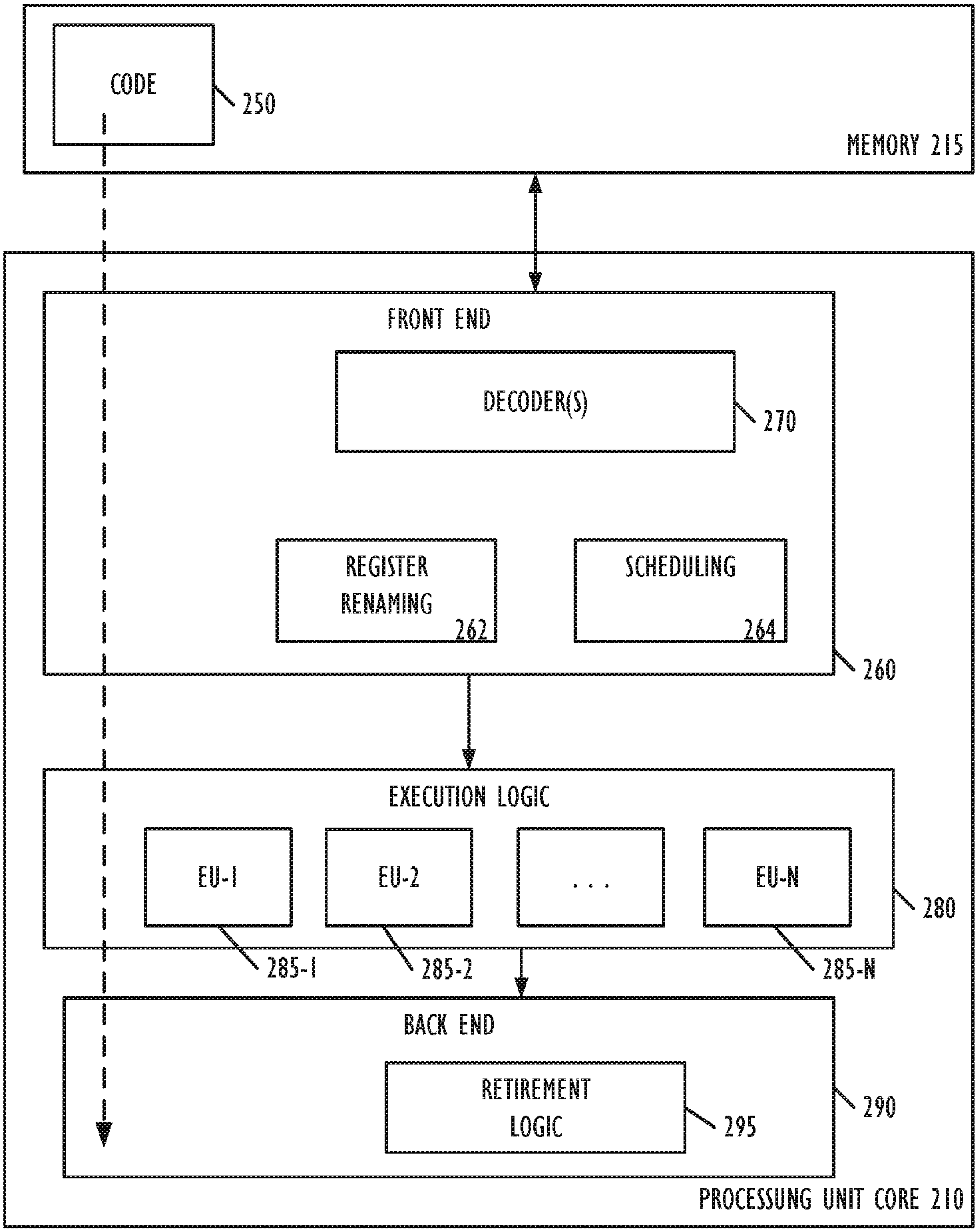
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Auto-Archiving and Indexing of Secondary Message Content

Auto-archiving and indexing of secondary message content from messages received by a centralized, multi-protocol communications system in a variety of communications formats and via a variety of delivery protocols may be achieved through the use of certain databases 104 of the centralized communications system. These databases are referred to in this disclosure as "Vault" storage databases or, simply, "Vault," for short. When a message, a data file, is received by the multi-protocol communications system, the central sync server 105 may initiate the following exemplary process to archive the message and its contents (including secondary message content, such as URL links and/or attachments from the message) and then index its contents to be searchable. Because the databases 104 of the multi-protocol communications system may act as a central repository for these messages, users are presumed to have registered for this service with the multi-protocol communications system and logged-in to the system using authorized credentials before viewing and/or searching across archived messages.

Figure 3A:
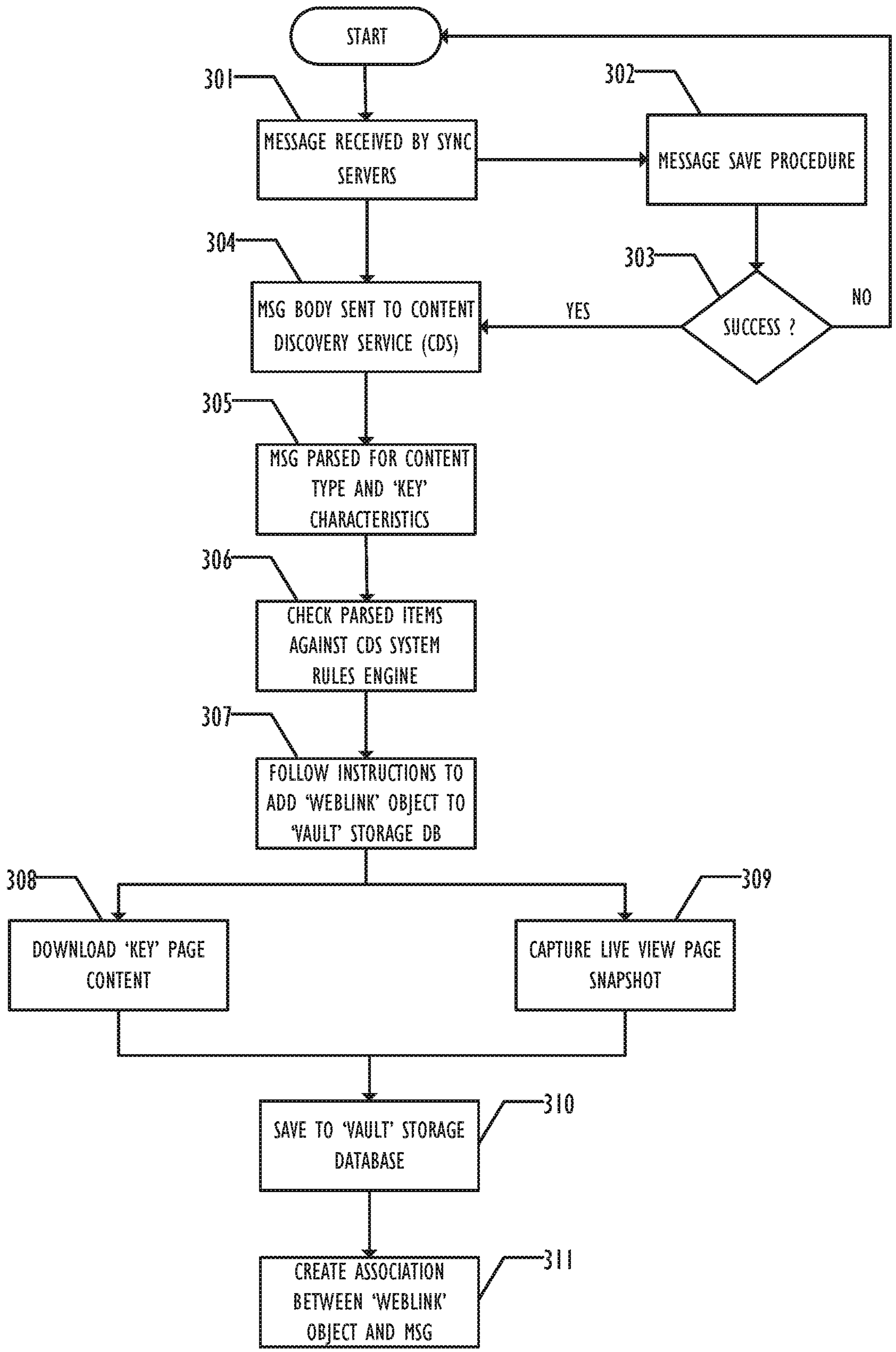
FIG. 3A is an exemplary flow diagram describing how the multi-protocol communications system may automatically archive and index message content, according to one or more of disclosed embodiments.

An example of this auto-archiving and indexing process is shown in FIG. 3A. When a message object is received by the multi-protocol communications system, at step 301, the message and data file may be converted (if necessary) to a so-called Universal Message Object (UMO) data structure, which will be described in more detail below with reference to FIG. 4. The incoming message may originate from any communications channel and in any format (e.g., a MIME email received via SMTP from a Gmail account, or an Instant Message received from a Facebook account). Upon receipt of the message and conversion (if necessary) into the UMO format, the system, at step 302, may initiate a procedure to save the message to the databases 104 of the system, e.g., the "Vault" storage databases.

At step 303, if the save procedure is successful, the body of the UMO message may be sent to what will be referred to herein as the Content Discovery Service (CDS), shown as step 304. If the save procedure is not successful, then the process reverts to step 301, and attempts the save procedure again. The CDS may comprise a software-implemented rules/machine-learning engine implementing a set of criteria, machine learning heuristics, artificial intelligence, or the like, designed to identify the "key," that is, relevant, pieces of content related to any given message in any given format. For example, in the case of an email message object, the CDS may disregard the email's, "To," "From," and "BCC" fields, and instead scan the rest of the message body and any relevant links, attachments, etc. thereto for relevant content, e.g., information, topics, or "keywords" from the message and its associated content that a user may later wish to search based on. Thus, at step 305, the CDS may parse the metadata of the UMO message to identify key characteristics of the message, such as its contents and its format. For example, the CDS may pull likely-relevant information, e.g., names, places, proper nouns, dates, times, URL links, media content, etc. from the message as potential "key" characteristics of the message. From this process, any secondary message content associated with the UMO message, if present, may also be identified. This process may also isolates the parsed items for individual processing, as will be described below. The isolated, parsed items may then be checked against the CDS Rules Engine at step 306 to determine if any particular actions should be take to archive, sort, and/or index the parsed item from the message. If there are parsed secondary message content items, such as a URL link, among the isolated, parsed items, then, at step 307, the system may follow the relevant instructions for processing the particular type of secondary message content item. For example, in the case of a URL link, the system may create a 'weblink' object based on the URL link located in the message and add the created 'weblink' object to a database, e.g., database 104, referred to here as the "Vault" database. The 'weblink' object may, e.g., be stored as a file of a pre-existing format (e.g., a PDF, a screenshot image, an exact HTML/CSS copy, a downloaded copy of an image or video, etc.). This object could also be stored in association with any relevant text-based tags associated with the URL link (e.g., by using full-text analyzers, computer vision-based, etc.).

The system may then proceed to step 308 and actually visit or 'crawl' the webpage (or other data item) linked to by the URL link located in the message and download any "key" page content on the associated webpage hosted at the URL link, e.g., text, images, video, and/or other media data. In parallel, at step 309, the process may also capture a live, i.e., contemporaneous, "snapshot" of the webpage (or other data item) linked to by the URL link located in the message. This may be particularly useful in situations where the content of a webpage changes frequently (or even if it changes slowly over time), so that, when the user goes back to search for a URL link sent to him by a particular contact (which may be years after the URL link was originally sent), the user is able to see the webpage as it looked at the date and time that the contact first transmitted the URL link to the user. This is much more likely to convey the actual content that the sender of the URL link actually wanted to convey to the recipient. The downloaded content may then be saved to the "Vault" database by the system at step 310. The system may then create an association between the created 'weblink' object and the originally received message at step 311. It is this message with the associated 'weblink' object that is then accessible to the user by search. In this manner, the URL link itself (as well as relevant content located on the webpage linked to by the URL link) are indexed and maintained on the databases 104 of the system in a quickly searchable fashion that is true-to-the-content of the URL link as of the date and time that it was sent by the sender.

It is to be understood that, if the data item associated with the secondary message content is something other than a URL link, e.g., a document or attachment, an analogous process may be undertaken by the system to download "key" content from the data item (step 308) and/or capture and save a live "snapshot" of the data item (step 309) as it existed at the time of sending. An object storing the non-URL link data item and the associated "key" content and/or snapshot may then also be stored in the Vault database (step 310) and associated with the message object that it was sent in (step 311).

Figure 3B:
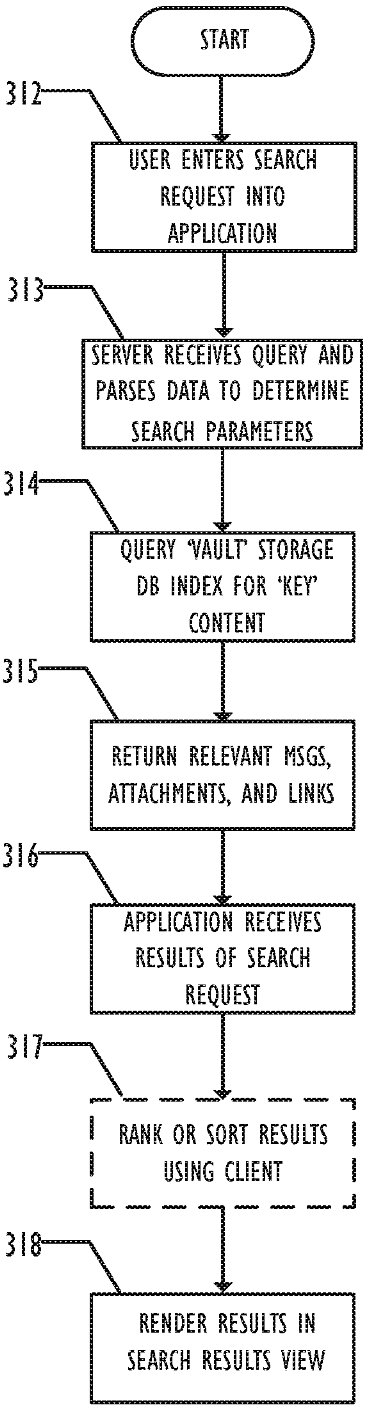
FIG. 3B is an exemplary flow diagram describing how the multi-protocol communications system may query its databases for user message content data that has been archived and indexed, according to one or more disclosed embodiments.

An exemplary process for searching and accessing saved messages and their associated attachments and web links is disclosed exemplarily in FIG. 3B. As disclosed above with respect to FIG. 3A, because the databases 104 of the multi-protocol communications system may act as the central repository of the archived and indexed messages, the user is presumed to be accessing the message and/or its related attachments or links through the user-facing interface (e.g., via a client application program) of the multi-protocol communications system. This application program may be executing on the user's computers 103 or mobile phones 102, and may act as the user's "communications portal" to the multi-protocol communications system.

The exemplary process shown in FIG. 3B commences with step 312, where the user may access the search functionality (e.g., search functionality 326 described with reference to FIG. 3C below) of the application of the multi-protocol communications system and enter one or more search terms into the application. The search may take the form of a simple keyword search or may combine search terms, such as the date/time of the last modification to the file, the date/time of receipt, the existence (or absence) of attachments, and any other typical searches that will be readily apparent to those of ordinary skill in the art. For the purposes of illustration, here it is presumed that the user has entered a simple "keyword" search term. In the case of a keyword-style search, the process may then proceed to step 313, where the sync servers 105 of the multi-protocol communications system receive the search request from the user. The sync server 105 parses the contents of the user's search request to determine the search parameters to be queried at the database 104. As noted above, if the user's search is a combination of search parameters, then the sync servers 105 will similarly recognize the compound search request and adjust its search query to the databases 104 to correspond to the user's request.

Upon identifying the "key" parameters of the search request, the process may proceed to step 314, where the sync servers 105 pass a search query to the databases 104 and utilize the database's search index, which may have been previously constructed, e.g., as disclosed with reference to FIG. 3A. The databases 104 parse the search query and perform the search against the index to identify message content and/or secondary message content, such as, attachments, documents, and/or 'weblink' objects, that satisfy the parameters of the search. At step 315, the results of the search are returned to the sync servers 105 by the databases 104. Those results may include a list of the relevant messages, attachments, documents, and/or URL links, along with the messages, attachments, documents, and/or URL links themselves. If the messages, attachments, documents, and/or URL links are returned, they may be those that were stored at the databases 104, as discussed above with reference to FIG. 3A. In the case of returned URL links, the URL link path address may be returned, along with a snapshot of the link target webpage or web-accessible file, or a clipping of relevant text or media from the link target webpage or web-accessible file. As mentioned with respect to FIG. 3A, because of the deep 'crawling' that may be performed by the system during the indexing process, a 'weblink' object sent to a user for a webpage related to classic cars may be returned in a keyword search for "cars" even if the text "cars" doesn't appear in the URL of the weblink object itself, e.g., based on the fact that the term "cars" and/or pictures or videos of cars are featured prominently in the actual content of the webpage that the URL links to. The depth to which a link target webpage (or web-accessible file) may be crawled is limited only by the time/storage space/computational capacity/interest of a given implementation.

Subsequently, at step 316, the sync servers 105 generate and return the results of the search request to the user-facing application. The search results set may be presented in a number of ways. For example, as shown at step 317, the search results set, comprised of the messages, attachments, document, and/or weblinks, may optionally be ranked, e.g., with the ranking based on a strength of the match with the search request. Alternately, the search results set may be a list, sortable against one or more of the search parameters entered by the user and/or one or more preferences of the user.

Finally, at step 318, the search results set may be presented to the user through the multi-protocol communication system's user-facing application. The results may be presented as a ranked list, a sortable list or chart, or any other method readily apparent to those of ordinary skill in the art. Using those results, a user may sort matches against one or more search parameters in an order of his or her choosing and then request the specific messages, attachments, documents, and/or weblinks to be retrieved from the sync servers 105, which will pass the requested data files to the user-facing application for user access.

Figure 3C:
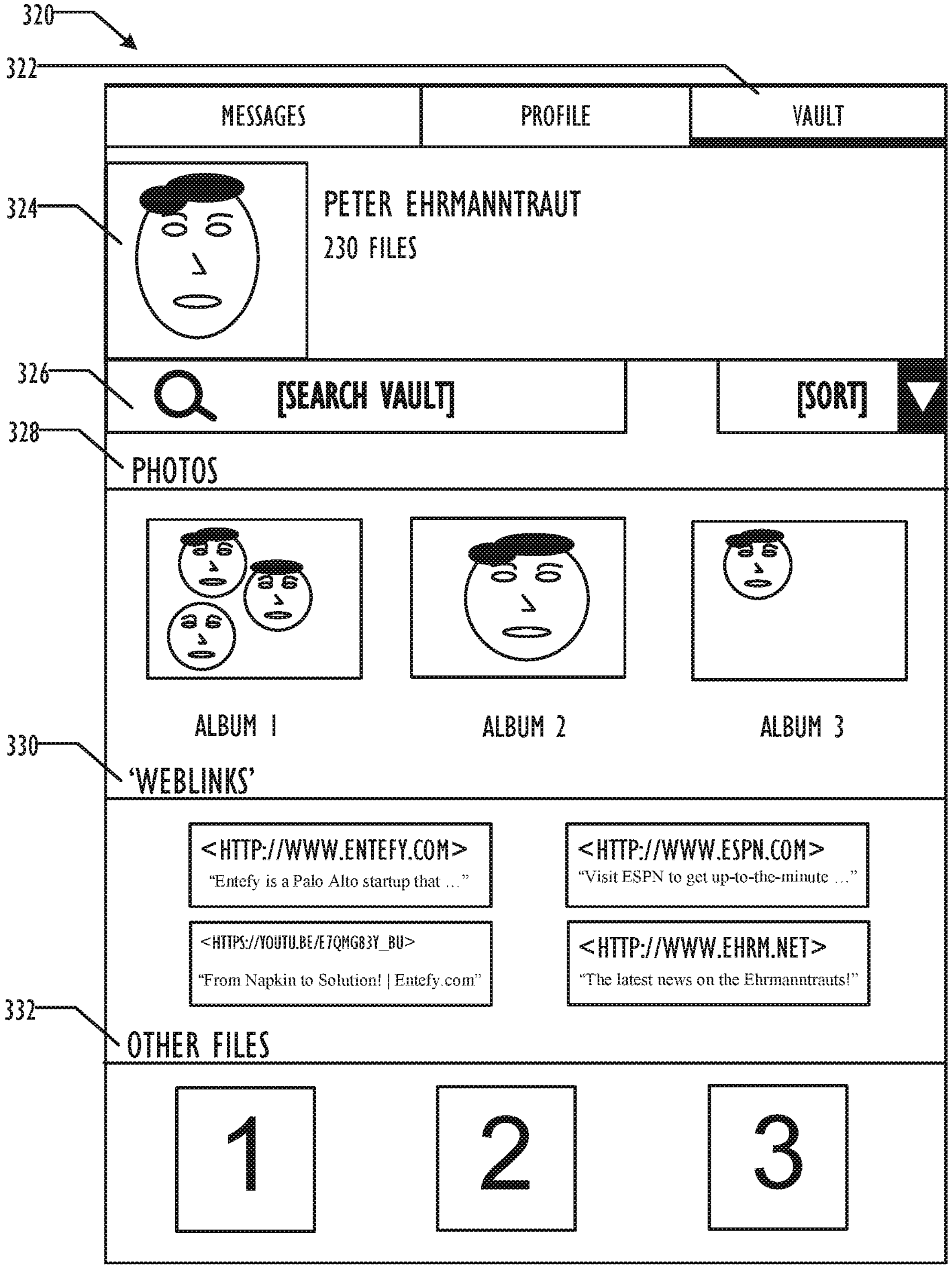
FIG. 3C is an exemplary document repository page from a user-facing application for displaying documents sent to or from a particular user, according to one or more embodiments.

Turning now to FIG. 3C, an exemplary document repository page 320 from a user-facing application for displaying documents sent to or from a particular user is shown, according to one or more embodiments. Row 322 in the example of FIG. 3C presents the user with the opportunity to select the particular sender 324's 'Vault' page, which is a document repository of all the files (and/or secondary message content) shared between the user of the user-facing application and a particular sender, which, in this example, is sender Peter Ehrmanntraut 324. In this example, there are 230 files (e.g., email attachments, photos, weblinks, etc.) that have been shared between the user of the user-facing application and sender Peter Ehrmanntraut 324. As mentioned above, a searching functionality 326 may be provided, which searches the attachments, documents, and/or weblinks associated with the particular user's Vault and a particular sender. A user's Vault may include: multimedia files 328, such as photos or videos; weblink objects 330 (as discussed herein); as well as other files 332, such as word processing and presentation documents.

As shown in FIG. 3C, weblink objects 330 may comprise the URL link path address itself, a snapshot of the link target webpage or web-accessible file, and/or a clipping of relevant text or media from the link target webpage or web-accessible file. [It is to be understood that, while FIG. 3C shows an embodiment of a document repository page 320 with documents sent to or from a particular user (i.e., Peter Ehrmanntraut), in other embodiments, a single document repository page could contain all of a user's content, or it could contain documents shared to and from a particular group of users.]

Figure 4A:
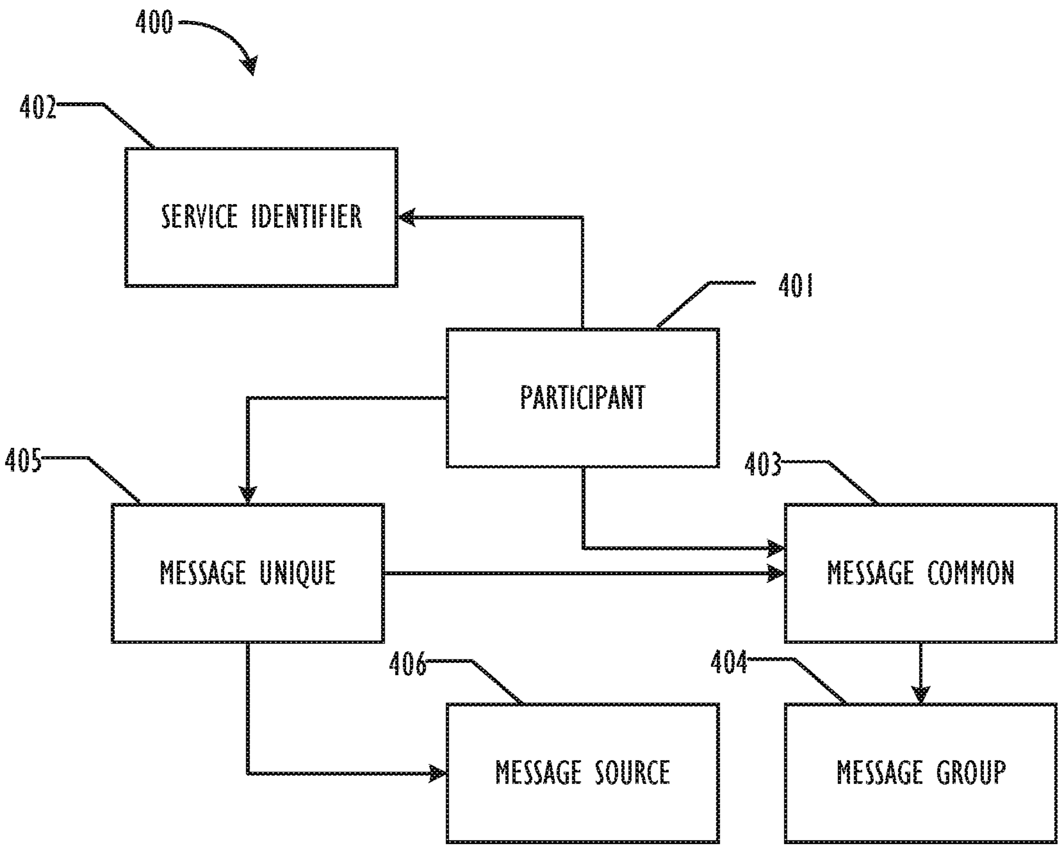
FIG. 4A is a block diagram of one embodiment of a Universal Message Object (UMO), according to one or more disclosed embodiments.

FIG. 4A shows a block diagram 400 of one embodiment of a Universal Message Object (UMO), according to one or more disclosed embodiments. The block diagram 400 describes the relationship between various components of data that make up an exemplary UMO object. It should be appreciated that the UMO facilitates not only the communication between 'on-network' and 'off-network' users, but also facilitates the backflow of updating relevant conversation histories based on the message format and communication protocol utilized.

Participant 401 objects represent an "on-network" or "off-network" users. Participant 401 objects correspond to any people identified in the traditional email format fields of "To," "From," "Cc," and "Bcc." However, the Participant 401 objects are not limited to this, as a Participant 401 may be any user engaged in the conversation, and is relational to the service being used as the underlying communication protocol.

Service Identifier 402 object represents the service utilized by a single Participant 401 object in the delivery of a format over a communication protocol. For each "To", "From," "Cc," and "Bcc" associated with a message, there may be a Participant 401 object containing a Service Identifier 402 indicating which service was used as the underlying format and communication protocol. The Service Identifier includes data related to the delivery of the message, including the type of the service, and the address. In the case of an SMS text message, a Service Identifier 402 object would have the type of "SMS" and the address would be respective telephone number. The Service Identifier 402 object implies a format and communication protocol unique to that indicated service.

Message Unique 405 is the representation format and communication protocol specific format for a message. For every message sent using a particular delivery method to one or more recipients, one or more Message Unique 405 objects may be instantiated. Message Unique 405 objects contain the format and communication protocol specific data gathered during the delivery process. For example, timestamps of "sent" and "received," based on the communication protocol, may be stored in this object. Additionally, in instances where the format and communication protocol are limited in some fundamental way, e.g. TWITTER® messages are limited to 140 characters and SMS text messages are limited to 160 characters, it may be necessary to send multiple messages across these communication protocols to fully convey the Sender's intended message. For this purpose, multiple Message Unique 405 objects would be instantiated to track the transmitted content.

The Message Common 403 object is the message that an "on-network" user views in their Inbox feed. For every user message sent, there are common components present in all formats and communication protocols. For efficiency, these common components are extracted and contained in one object. Because of this efficiency, there is one Message Common 403 object for every message sent by the Sender. For example, the Message Common 403 object may store the body of the message, as well as the time sent at the moment the Sender selects 'send,' not the actual 'sent time' as reported by the underlying communication protocol (which may vary from protocol to protocol). This has the advantage of presenting one 'unified' or 'common' view to the Sender and recipient(s), while resolving minor discrepancies from the underlying communication protocols.

The Message Source 406 object is a representation of the Message Unique 405 object, e.g., in a Javascript object notation (JSON) format. The Message Source 406 object may thus have a one-to-one relationship with the Message Unique 405 object.

Message Group 404 object is a representative identifier that coordinates a Message Common 403 object. The purpose of a Message Group 404 object is to enable multi-protocol communication and establish a relationship between those messages. There may also be a one-to-one relationship between the Message Group 404 object and the Message Common 403 object.

Turning now to FIGS. 4B-4D, a code representation of an exemplary Unified Message Object (UMO) is shown, for illustrative purposes. To enable certain efficiencies and functionalities to be realized, the UMO may be converted into an extensible format to allow for the representation, and subsequent conversion, of the dissimilar components. Javascript object notation (JSON) is a format that allows for a flexible field enumeration, as well as parsers and database conversion tools. In this embodiment, fields from the multiple objects of the Universal Message Object can be related and combined to create a unified view of the UMO and its components. The conversion of any incoming messages to a common format allows for more efficient extraction of fields used in by any predicative data models. Put another way, the common format is an intermediary format for more efficient processing inside the exemplary multi-format, multi-protocol communication system described herein.

EXAMPLES

The following examples pertain to further embodiments.

Example 1 is a non-transitory computer readable medium that comprises computer executable instructions stored thereon to cause one or more processing units to: receive a first message in a first communications format; parse the first message based, at least in part, on the first communications format, to extract one or more characteristics; apply a first set of rules to the one or more characteristics; discover a first secondary message content item based, at least in part, on the application of the first set of rules to the one or more characteristics; store the first secondary message content item in a database; store one or more key content items associated with the first secondary message content item in the database; index the one or more key content items; and associate the one or more indexed key content items and the first secondary message content item with the first message in the database.

Example 2 includes the subject matter of example 1, wherein the computer executable instructions further cause the one or more processing units to: store a first contemporaneous data item associated with the first secondary message content item in the database; and associate the first contemporaneous data item with the one or more indexed key content items and the first secondary message content item in the database.

Example 3 includes the subject matter of example 2, wherein the computer executable instructions further cause the one or more processing units to: index the first contemporaneous data item.

Example 4 includes the subject matter of example 1, wherein the computer executable instructions further cause the one or more processing units to: receive, from a first client application, a first query for content associated with the first secondary message content item; and generate a result set comprising at least one of the following: the first message; the first secondary message content item; and the one or more key content items associated with the first secondary message content item.

Example 5 includes the subject matter of example 4, wherein the result set is sorted based, at least in part, on a preference of a user of the first client application.

Example 6 includes the subject matter of example 2, wherein the computer executable instructions further cause the one or more processing units to: receive, from a first client application, a first query for content associated with the first secondary message content item; and generate a result set comprising at least one of the following: the first message; the first secondary message content item; the one or more key content items associated with the first secondary message content item; and the first contemporaneous data item associated with the first secondary message content item.

Example 7 includes the subject matter of example 1, wherein the first secondary message content item comprises at least one of the following: an attachment to the first message; a document associated with the first message; and a URL link from the first message.

Example 8 includes the subject matter of example 1, wherein the instructions to store one or more key content items associated with the first secondary message content item in the database further comprise instructions to crawl a webpage associated with the first secondary message content item.

Example 9 includes the subject matter of example 8, wherein the instructions to store one or more key content items associated with the first secondary message content item in the database further comprise instructions to store one or more media items from the webpage associated with the first secondary message content item.

Example 10 includes the subject matter of example 4, wherein: the first secondary message content item comprises a URL link, and the one or more key content items associated with the first secondary message content item comprise at least one of the following: a path address of the URL link; a contemporaneous capture of the URL link target webpage or web-accessible file; and a clipping of text or media from the URL link target webpage or web-accessible file.

Example 11 is a computer-implemented method, comprising: receiving a first message in a first communications format; parsing the first message based, at least in part, on the first communications format, to extract one or more characteristics; applying a first set of rules to the one or more characteristics; discovering a first secondary message content item based, at least in part, on the application of the first set of rules to the one or more characteristics; storing the first secondary message content item in a database; storing one or more key content items associated with the first secondary message content item in the database; indexing the one or more key content items; and associating the one or more indexed key content items and the first secondary message content item with the first message in the database.

Example 12 includes the subject matter of example 11, further comprising: storing a first contemporaneous data item associated with the first secondary message content item in the database; and associating the first contemporaneous data item with the one or more indexed key content items and the first secondary message content item in the database.

Example 13 includes the subject matter of example 12, further comprising: indexing the first contemporaneous data item.

Example 14 includes the subject matter of example 11, further comprising: receiving, from a first client application, a first query for content associated with the first secondary message content item; and generating a result set comprising at least one of the following: the first message; the first secondary message content item; and the one or more key content items associated with the first secondary message content item.

Example 15 includes the subject matter of example 14, wherein the result set is sorted based, at least in part, on a preference of a user of the first client application.

Example 16 includes the subject matter of example 12, further comprising: receiving, from a first client application, a first query for content associated with the first secondary message content item; and generating a result set comprising at least one of the following: the first message; the first secondary message content item; the one or more key content items associated with the first secondary message content item; and the first contemporaneous data item associated with the first secondary message content item.

Example 17 includes the subject matter of example 11, wherein the first secondary message content item comprises at least one of the following: an attachment to the first message; a document associated with the first message; and a URL link from the first message.

Example 18 includes the subject matter of example 11, wherein the act of storing one or more key content items associated with the first secondary message content item in the database further comprises crawling a webpage associated with the first secondary message content item.

Example 19 includes the subject matter of example 18, wherein the act of storing one or more key content items associated with the first secondary message content item in the database further comprises storing one or more media items from the webpage associated with the first secondary message content item.

Example 20 includes the subject matter of example 14, wherein: the first secondary message content item comprises a URL link, and the one or more key content items associated with the first secondary message content item comprise at least one of the following: a path address of the URL link; a contemporaneous capture of the URL link target webpage or web-accessible file; and a clipping of text or media from the URL link target webpage or web-accessible file.

Example 21 is a system, comprising: a memory; and one or more processing units, communicatively coupled to the memory, wherein the memory stores instructions to configure the one or more processing units to: receive a first message in a first communications format; parse the first message based, at least in part, on the first communications format, to extract one or more characteristics; apply a first set of rules to the one or more characteristics; discover a first secondary message content item based, at least in part, on the application of the first set of rules to the one or more characteristics; store the first secondary message content item in a database; store one or more key content items associated with the first secondary message content item in the database; index the one or more key content items; and associate the one or more indexed key content items and the first secondary message content item with the first message in the database.

Example 22 includes the subject matter of example 21, wherein the instructions are further configured to cause the one or more processing units to: store a first contemporaneous data item associated with the first secondary message content item in the database; index the first contemporaneous data item; and associate the indexed first contemporaneous data item with the one or more indexed key content items and the first secondary message content item in the database.

Example 23 includes the subject matter of example 21, wherein the instructions are further configured to cause the one or more processing units to: receive, from a first client application, a first query for content associated with the first secondary message content item; and generate a result set comprising at least one of the following: the first message; the first secondary message content item; and the one or more key content items associated with the first secondary message content item.

Example 24 includes the subject matter of example 21, wherein the first secondary message content item comprises at least one of the following: an attachment to the first message; a document associated with the first message; and a URL link from the first message.

Example 25 includes the subject matter of example 21, wherein the instructions to store one or more key content items associated with the first secondary message content item in the database further comprise instructions to crawl a webpage associated with the first secondary message content item.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled.

The invention claimed is:

1. A centralized, multi-protocol communication system, the centralized, multi-protocol communication comprising:

a non-transitory memory storing instructions; and one or more hardware processors communicatively coupled to the non-transitory memory, wherein the one or more hardware processors are configured to execute the instructions that cause the centralized, multi-protocol communication system to perform operations comprising:

receiving, at a centralized synchronization server of the centralized, multi-protocol communication system, a plurality of electronic messages in a plurality of data communication formats transmitted over a plurality of communication protocols;

converting, by the centralized synchronization server, the plurality of electronic messages to a plurality of universal message object (UMO) data structures, wherein the plurality of UMO data structures are in an extensible format utilizable by different data parsers;

parsing, using a data parser executed by the centralized synchronization server, a first message object and first metadata from a first message of the plurality of electronic messages based on a corresponding one of the plurality of UMO data structures, wherein the first message object is in a first data communication format and a first communication protocol of the first message from the plurality of data communication formats and the plurality of communication protocols;

executing, by the centralized synchronization server, a first set of computing instructions for processing a type of message content found in the first message based on the parsing, wherein the type of the message content is associated with the first message object parsed by the data parser;

responsive to the executing the first set of computing instructions, generating, using an artificial intelligence (AI) engine of the centralized, multi-protocol communication system and based on the parsed first message object and the parsed first metadata, a first set of keys that standardize the first message object in the first data communication format for a multi-format search system, wherein the first set of keys correspond to one or more first characteristics of the first message, wherein the first set of keys identify first content in the first message object and the first metadata independent of requiring searching the first content in the first data communication format by the multi-format search system, and wherein the AI engine implements machine learning heuristics to identify key content items in the first data from the parsing;

extracting, by the centralized synchronization server, first information associated with the first set of keys;

identifying, by the centralized synchronization server, second information associated with secondary message content that requires an action for indexing, wherein the secondary message content is indexed for the corresponding one of the plurality of UMO data structures corresponding to the first message;

executing, by the centralized synchronization server, a second set of computing instructions for indexing the secondary message content identified using the action;

updating, by the centralized synchronization server, the corresponding one of the plurality of UMO data structures with first set of keys, the first information, and the second information having the secondary message content indexed;

executing, by a content delivery service (CDS) executed by the centralized synchronization server, a search of the plurality of UMO data structures for a second message corresponding to the first characteristics using the multi-format search system and a second set of keys for the second message, wherein the second message includes second characteristics corresponding to the second set of keys, wherein the second characteristics are associated with the first characteristics and second content in the second message;

generating, by the CDS, a unified view of the first message and the second message in a user interface based on the plurality of UMO data structures, wherein the unified view enables searching of at least the first message and the second message using the first set of keys and the second set of keys by the multi-format search system independent of searching corresponding content in the plurality of data communication formats; and outputting, by the CDS to one or more user devices, the unified view in the user interface.

2. The centralized, multi-protocol communication system of claim 1, wherein the operations further comprise:

applying a set of rules to the first characteristics using the AI engine, wherein the set of rules are associated with actions to be taken with the key content items from the first content; and storing the corresponding one of the plurality of UMO data structures for the first message with the first characteristics based on applying the set of rules.

3. The centralized, multi-protocol communication system of claim 2, wherein the operations further comprise:

indexing a database storing the plurality of UMO data structures based at least on the first characteristics and the second characteristics.

4. The centralized, multi-protocol communication system of claim 1, wherein the operations further comprise:

extracting one or more content items from the first content; and storing the one or more content items from the first data with the corresponding one of the plurality of UMO data structures for the first message.

5. The centralized, multi-protocol communication system of claim 1, wherein the first set or the second set of keys comprise at least one of a name, a place, a proper noun, a date, a time, a uniform resource locator (URL) link, or media content.

6. The centralized, multi-protocol communication system of claim 1, wherein the parsing the first data includes:

isolating a secondary message item from the first content; and determining secondary item data for the secondary message item.

7. The centralized, multi-protocol communication system of claim 6, wherein the determining the secondary item data comprises:

crawling a webpage associated with the secondary message item; and capturing one of a snapshot of the webpage or a download of page content from the webpage based on the crawling.

8. The centralized, multi-protocol communication system of claim 6, wherein the secondary message item comprises at least one of an attachment to the first message, a document associated with the first message, or a weblink object based on a URL link embedded in the first message.

9. A computer-implemented method for a centralized, multi-protocol communication system, the method comprising:

receiving, at a centralized synchronization server of the centralized, multi-protocol communication system comprising one or more hardware processors coupled to a non-transitory memory, a plurality of electronic messages in a plurality of data communication formats transmitted over a plurality of communication protocols;

converting, using the one or more hardware processors, the plurality of electronic messages to a plurality of universal message object (UMO) data structures, wherein the plurality of UMO data structures are in an extensible format utilizable by different data parsers;

parsing, using the one or more hardware processors and a data parser executed by the centralized synchronization server, a first message object and first metadata from a first message of the plurality of electronic messages based on a corresponding one of the plurality of UMO data structures, wherein the first message object is in a first data communication format and a first communication protocol of the first message from the plurality of data communication formats and the plurality of communication protocols;

executing, using the one or more hardware processors, a set of computing instructions for processing a type of message content found in the first message based on the parsing, wherein the type of the message content is associated with the first message object parsed by the data parser;

responsive to the executing the first set of computing instructions, generating, using an artificial intelligence (AI) engine of the centralized, multi-protocol communication system executed by the one or more hardware processors and based on the parsed first message object and the parsed first metadata, a first set of keys that standardize the first message object in the first data communication format for a multi-format search system, wherein the first set of keys correspond to one or more first characteristics of the first message, wherein the first set of keys identify first content in the first message object and the first metadata independent of requiring searching the first content in the first data communication format by the multi-format search system, and wherein the AI engine implements machine learning heuristics to identify key content items in the first data from the parsing;

extracting, by the centralized synchronization server, first information associated with the first set of keys;

identifying, by the centralized synchronization server, second information associated with secondary message content that requires an action for indexing, wherein the secondary message content is indexed for the corresponding one of the plurality of UMO data structures corresponding to the first message;

executing, by the centralized synchronization server, a second set of computing instructions for indexing the secondary message content identified using the action;

updating, by the centralized synchronization server, the corresponding one of the plurality of UMO data structures with first set of keys, the first information, and the second information having the secondary message content indexed;

executing, using the one or more hardware processors by a content delivery service (CDS) executed by the centralized synchronization server, a search of the plurality of UMO data structures for a second message corresponding to the first characteristics using the multi-format search system and a second set of keys for the second message, wherein the second message includes second characteristics corresponding to the second set of keys, wherein the second characteristics are associated with the first characteristics and second content in the second message;

generating, using the one or more hardware processors by the CDS, a unified view of the first message and the second message in a user interface based on the plurality of UMO data structures, wherein the unified view enables searching of at least the first message and the second message using the first set of keys and the second set of keys by the multi-format search system independent of searching corresponding content in the plurality of data communication formats; and outputting, using the one or more hardware processors by the CDS to one or more user devices, the unified view in the user interface.

10. The computer-implemented method of claim 9, further comprising:

applying, using the one or more hardware processors, a set of rules to the first characteristics, wherein the set of rules are associated with actions to be taken with the key content items from the first content; and storing, using the one or more hardware processors, the corresponding one of the plurality of UMO data structures for the first message with the first characteristics based on applying the set of rules.

11. The computer-implemented method of claim 10, further comprising:

indexing, using the one or more hardware processors, a database storing the plurality of UMO data structures based at least on the first characteristics and the second characteristics.

12. The computer-implemented method of claim 9, further comprising:

extracting, using the one or more hardware processors, one or more content items from the first content; and storing, using the one or more hardware processors, the one or more content items from the first data with the corresponding one of the plurality of UMO data structures for the first message.

13. The computer-implemented method of claim 9, wherein the first set or the second set of keys comprise at least one of a name, a place, a proper noun, a date, a time, a uniform resource locator (URL) link, or media content.

14. The computer-implemented method of claim 9, wherein the parsing the first data includes:

isolating, using the one or more hardware processors, a secondary message item from the first content; and determining, using the one or more hardware processors, secondary item data for the secondary message item.

15. The computer-implemented method of claim 14, wherein the determining the secondary item data comprises:

crawling, using the one or more hardware processors, a webpage associated with the secondary message item; and capturing, using the one or more hardware processors, one of a snapshot of the webpage or a download of page content from the webpage based on the crawling.

16. The computer-implemented method of claim 14, wherein the secondary message item comprises at least one of an attachment to the first message, a document associated with the first message, or a weblink object based on a URL link embedded in the first message.

17. A non-transitory computer readable storage medium comprising computer executable instructions stored thereon to cause, when executed, one or more processing units to perform operations comprising:

receiving, at a centralized synchronization server for the centralized, multi-protocol communication system, a plurality of electronic messages in a plurality of data communication formats transmitted over a plurality of communication protocols;

converting the plurality of electronic messages to a plurality of universal message object (UMO) data structures, wherein the plurality of UMO data structures are in an extensible format utilizable by different data parsers;

parsing, using a data parser executed by the centralized synchronization server, a first message object and first metadata from a first message of the plurality of electronic messages based on a corresponding one of the plurality of UMO data structures, wherein the first message object is in a first data communication format and a first communication protocol of the first message from the plurality of data communication formats and the plurality of communication protocols;

executing a first set of computing instructions for processing a type of message content found in the first message based on the parsing, wherein the type of the message content is associated with the first message object parsed by the data parser;

responsive to the executing the first set of computing instructions, identifying, using an artificial intelligence (AI) engine of the centralized, multi-protocol communication system and based on the parsed first message object and the parsed first metadata, a first set of keys that standardize the first message object in the first data communication format for a multi-format search system, wherein the first set of keys correspond to one or more first characteristics of the first message, wherein the first set of keys identify first content in the first message object and the first metadata independent of requiring searching the first content in the first data communication format by the multi-format search system, and wherein the AI engine implements machine learning heuristics to identify key content items in the first data from the parsing;

extracting, by the centralized synchronization server, first information associated with the first set of keys;

identifying, by the centralized synchronization server, second information associated with secondary message content that requires an action for indexing, wherein the secondary message content is indexed for the corresponding one of the plurality of UMO data structures corresponding to the first message;

executing, by the centralized synchronization server, a second set of computing instructions for indexing the secondary message content identified using the action;

updating, by the centralized synchronization server, the corresponding one of the plurality of UMO data structures with first set of keys, the first information, and the second information having the secondary message content indexed;

executing, by a content delivery service (CDS) executed by the centralized synchronization server, a search of the plurality of UMO data structures for a second message corresponding to the first characteristics using the multi-format search system and a second set of keys for the second message, wherein the second message includes second characteristics corresponding to the second set of keys, wherein the second characteristics are associated with the first characteristics and second content in the second message;

generating, by the CDS, a unified view of the first message and the second message in a user interface based on the plurality of UMO data structures, wherein the unified view enables searching of at least the first message and the second message using the first set of keys and the second set of keys by the multi-format search system independent of searching corresponding content in the plurality of data communication formats; and outputting, by the CDS to one or more user devices, the unified view in the user interface.

18. The non-transitory computer readable storage medium of claim 17, wherein the operations further comprise:

applying a set of rules to the first characteristics using the AI engine, wherein the set of rules are associated with actions to be taken with the key content items from the first content; and storing the corresponding one of the plurality of UMO data structures for the first message with the first characteristics based on applying the set of rules.

19. The non-transitory computer readable storage medium of claim 18, wherein the operations further comprise:

indexing a database storing the plurality of UMO data structures based at least on the first characteristics and the second characteristics.

20. The non-transitory computer readable storage medium of claim 17, wherein the operations further comprise:

extracting one or more content items from the first content; and storing the one or more content items from the first data with the corresponding one of the plurality of UMO data structures for the first message.

* * * * *